United States Patent
Deppert et al.

(10) Patent No.: US 9,677,623 B2
(45) Date of Patent: Jun. 13, 2017

(54) STRUCTURAL UNIT FOR A DRIVE TRAIN OF A MOTOR VEHICLE

(71) Applicant: ZF FRIEDRICHSHAFEN AG, Friedrichshafen (DE)

(72) Inventors: Reinhard Deppert, Gochsheim (DE); Sven Ludsteck, Muennerstadt (DE); Alexander Bartha, Wuerzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 72 days.

(21) Appl. No.: 14/765,368

(22) PCT Filed: Jan. 9, 2014

(86) PCT No.: PCT/EP2014/050289
§ 371 (c)(1),
(2) Date: Aug. 3, 2015

(87) PCT Pub. No.: WO2014/117979
PCT Pub. Date: Aug. 7, 2014

(65) Prior Publication Data
US 2015/0369298 A1    Dec. 24, 2015

(30) Foreign Application Priority Data
Feb. 1, 2013   (DE) .................. 10 2013 201 666

(51) Int. Cl.
*F16D 13/58*   (2006.01)
*F16F 15/14*   (2006.01)
*F16D 13/40*   (2006.01)

(52) U.S. Cl.
CPC ............ *F16D 13/58* (2013.01); *F16F 15/145* (2013.01); *F16F 15/1414* (2013.01); *F16D 13/40* (2013.01); *F16D 13/585* (2013.01); *F16D 2300/22* (2013.01); *Y10S 903/902* (2013.01)

(58) Field of Classification Search
None
See application file for complete search history.

(56) References Cited

U.S. PATENT DOCUMENTS

| | | |
|---|---|---|
| 4,842,116 A | 6/1989 | Fukushima |
| 6,358,153 B1 | 3/2002 | Carlson et al. |
| 6,382,050 B1 | 5/2002 | Carlson et al. |
| 2001/0032769 A1 | 10/2001 | Lehmann et al. |

FOREIGN PATENT DOCUMENTS

| | | |
|---|---|---|
| DE | 37 02 842 A1 | 8/1987 |
| DE | 199 11 560 A1 | 9/2000 |
| DE | 199 11 561 A1 | 9/2000 |
| DE | 199 54 274 A1 | 5/2001 |
| DE | 10 2009 051 724 A1 | 5/2010 |

*Primary Examiner* — Jacob S Scott
*Assistant Examiner* — Timothy M Hannon
(74) *Attorney, Agent, or Firm* — Cozen O'Connor

(57) ABSTRACT

A constructional unit for a drivetrain of a motor vehicle includes: at least one clutch arrangement configured to decouple an internal combustion engine from the drivetrain, the at least one clutch arrangement having at least one clutch element; a speed-adaptive vibration absorber apparatus, configured to reduce vibrations in the drivetrain with at least one damper mass deflectable along a deflection path; and a limiting device configured to exert a force on the at least one damper mass that limits the movement of the damper mass. The limiting device is further configured, for limiting the movement of the at least one damper mass, to be actuatable by the at least one clutch element.

17 Claims, 4 Drawing Sheets

US 9,677,623 B2

STRUCTURAL UNIT FOR A DRIVE TRAIN OF A MOTOR VEHICLE

CROSS-REFERENCE TO RELATED APPLICATIONS

This is a U.S. national stage of application No. PCT/EP2014/050289, filed on 9 Jan. 2014, which claims priority to the German Application No. 10 2013 201 666.2, filed 1 Feb. 2013, the content of both incorporated herein by reference.

BACKGROUND OF THE INVENTION

1. Field of the Invention

The present invention is directed to a constructional unit for a drivetrain of a motor vehicle with at least one clutch arrangement configured to decouple an internal combustion engine from the drivetrain, and with a speed-adaptive vibration absorber apparatus, particularly a centrifugal pendulum absorber, for reducing vibrations in the drivetrain with at least one damper mass that can be deflected along a deflection path, wherein there is further provided a limiting device configured to exert a force on the at least one damper mass such that the movement of the damper mass is at least limited, and to a hybrid drivetrain arrangement.

2. Related Art

Speed-adaptive vibration absorbers, particularly centrifugal pendulum absorbers, are used to reduce irregularities in the drivetrain. Annoying noises can occur at low speeds, for example, when starting and stopping the engine, because the damper masses are no longer held by centrifugal force and knock against the boundaries of the damper path due to the force of gravity.

Therefore, it has been suggested, for example, in DE 199 54 274 or DE 10 2009 051 724, to limit the movement of the damper mass at low speeds and to apply a force to the damper mass which clamps the damper mass. The limiting devices are constructed in such a way that they automatically fix the damper mass when speed is reduced and, therefore, when there is a reduction in centrifugal force. However, this prior art has the drawback that these speed-dependent limiting devices reliably secure the damper mass only at extremely low speeds. If the speed-adaptive vibration absorber is used, for example, in connection with an electric machine having rather low speeds, rattling noises may result in spite of the automatic clamping device because the speed-dependent limiting of movement of the damper masses is only initiated at extremely low speeds.

SUMMARY OF THE INVENTION

Therefore, it is an object of the present invention to provide a speed-adaptive vibration absorber that allows the movement of the damper masses to be limited in a reliable manner.

This object is met through a constructional unit and a hybrid drivetrain.

According to one aspect of the invention, there is provided a constructional unit for a drivetrain of a motor vehicle with at least one clutch arrangement configured to decouple an internal combustion engine from the drivetrain. The constructional unit further comprises a speed-adaptive vibration absorber apparatus, particularly a centrifugal pendulum absorber, for reducing vibrations in the drivetrain with at least one damper mass that can be deflected along a deflection path, wherein there is further provided a limiting device configured to exert a force on the at least one damper mass such that the movement of the damper mass is at least limited.

The invention is based, according to one aspect, on the idea that for the purpose of limiting the movement of the at least one damper mass, the limiting device is constructed such that it can be actuated by at least one element of the clutch arrangement. This means that the damper mass is not acted upon by a movement-limiting force depending on a speed, as is known from the prior art, but rather the damper mass is actively operated upon by an element of the clutch mechanism.

In view of the fact that a disconnect clutch is provided, particularly in hybrid drives, which decouples the internal combustion engine from the drivetrain and which ensures that only the electric machine transmits a torque to the drivetrain, the constructional unit according to an aspect of the invention causes the damper masses to be actuated and acted upon by force actively and more or less simultaneously with the clutch in purely electric operating conditions having low speed. In this way, the movement of the damper mass is reliably limited also at low speeds so that rattling is prevented.

According to a further advantageous embodiment example, the limiting device is further configured to apply a substantially axial force to the damper mass. In view of the fact that the radial installation space is very limited particularly when used in hybrid drives, the limiting device does not take up additional radial installation space. Further, the clutch arrangement acts substantially axially so that the axial movement of the clutch elements can be used to exert an axial force on the damper masses.

According to a further advantageous embodiment example, the limiting device has at least one operative element configured to act in a limiting manner on the damper masses, and the at least one operative element is preferably constructed so as to be axially elastic. In principle, a multitude of movement-limiting devices are conceivable. However, the use of a preferably axially elastic operative element has the advantage that it can be arranged in the constructional unit in a very compact manner. Further, the axial elasticity makes it possible to compensate for an axial change in the movement path of the clutch arrangement brought about by wear such that the force exerted on the damper masses remains substantially constant even when the axial path of the clutch element actuating the limiting device changes.

It is further advantageous when the at least one operative element is constructed so as to be preloaded preferably opposite to the direction of application of force. In this way, the operative element can be backed off automatically from the damper mass when the clutch element no longer exerts force on the operative element.

According to a further advantageous embodiment example, the at least one operative element is constructed as a spring-loaded pressing element, particularly as a spring-loaded pressing pin. Pressing pins of this type are easy to install and apply force in a reliable manner.

Alternatively or additionally, the at least one operative element can also be formed as an elastomer. A construction of this kind has the advantage that it obviates the use of further mechanical spring elements which are more prone to malfunction. Further, an elastomer represents a very inexpensive variant.

In another advantageous embodiment, the operative element is formed as a spring element, particularly a tangential leaf spring, disk spring or diaphragm spring. This is particularly advantageous when the operative element is actuated by a clutch element arranged radially within the vibration absorber.

According to a further advantageous embodiment example, the operative element is directly connected to the clutch element. In this way, an axial force can be exerted directly on the at least one damper mass.

A resilient return element of the clutch arrangement, particularly a diaphragm spring and/or a clutch actuation unit, particularly a clutch release, can advantageously be used as an actuating clutch element. Since these elements are axially movable and can be arranged in the vicinity of the vibration absorber apparatus, they can easily be used for actuating the engagement device.

According to a further advantageous embodiment example, the vibration absorber apparatus further has a damper mass carrier at which the damper mass is pendulously mounted.

This allows the damper mass to be acted upon in such a way that it is pressed by the operative element against the damper mass carrier and contacts the latter.

According to a further advantageous embodiment example, the constructional unit according to the invention further has an electric machine with a stator and a rotor, wherein the clutch arrangement and/or the vibration absorber apparatus and/or the limiting device are preferably arranged radially within the rotor. The arrangement of the clutch mechanism, vibration absorber and/or limiting device radially within the rotor has the advantage that only very little axial installation space is taken up by the constructional unit.

In this respect, it is particularly advantageous when the operative element is formed so as to be spring-loaded opposite the rotor. Since the rotor is an axially fixed, adjacently arranged element, further axial installation space can be saved through the preloading at the rotor.

According to a further advantageous embodiment example, the rotor further has a radially inwardly extending rotor projection, which preferably also serves as supporting element for at least one element of the clutch arrangement, particularly for a resilient return element of the clutch arrangement. Further, the vibration absorber apparatus in its entirety, particularly the damper mass carrier, can also be arranged at the rotor and/or at the rotor projection so as to be fixed with respect to relative rotation. As a result of all of these arrangements, a constructional unit is provided which is very compact axially and which can be installed particularly in hybrid drives.

A further aspect of the present invention relates to a hybrid drivetrain arrangement with an internal combustion engine and an electric machine provided parallel to the internal combustion engine for transmitting torque from the internal combustion engine and/or the electric machine to an output unit, particularly a transmission, wherein a constructional unit is arranged between the internal combustion engine and output unit. Since, as was already described above, the constructional unit occupies very little axial installation space, the entire installation space requirement for the hybrid drivetrain arrangement can be reduced in an advantageous manner.

Further advantages and preferred embodiment forms are defined in the claims, the description and the drawings.

BRIEF DESCRIPTION OF THE DRAWINGS

The invention will be described more fully in the following with reference to embodiment examples shown in the drawings. In this regard, the depicted embodiment examples are of a purely exemplary nature and are not intended to limit the protective scope of the invention. The protective scope is defined solely by the appended claims.

In the drawings.

DETAILED DESCRIPTION OF THE PRESENTLY PREFERRED EMBODIMENTS

Figure 1:
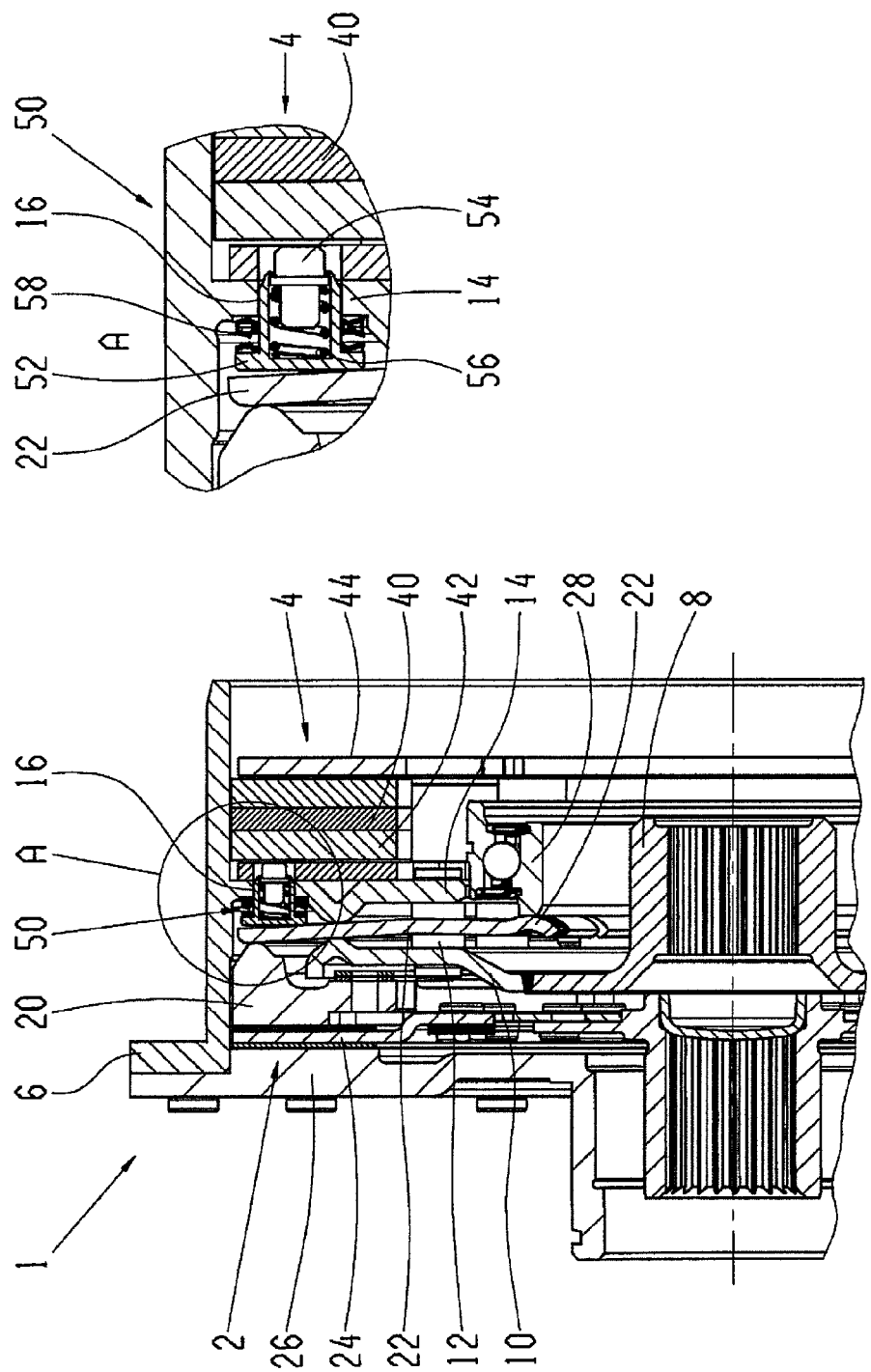
FIG. 1 shows a schematic rendering of a first preferred embodiment example of the constructional unit according to the invention.

In the following, identical or functionally equivalent structural component parts are designated by identical reference characters.

FIGS. 1 to 4 show a schematic sectional view through a constructional unit 1 in which a clutch arrangement 2 and a vibration absorber 4 are arranged radially within a rotor carrier 6 of an electric machine, not shown in more detail.

The clutch arrangement 2 comprises a pressure plate 20 to which force is applied by a diaphragm spring 22 and which is configured to move a clutch disk 24 into frictional engagement with a complementary friction face 26. To open the clutch mechanism 2, the diaphragm spring 22 is actuated by a clutch actuation mechanism 28, particularly a clutch release. This moves the pressure plate 20 and complementary friction face 26 out of frictional engagement with the clutch disk 24.

Since the clutch disk 24 is connected to an output shaft of an internal combustion engine (not shown) so as to be fixed with respect to rotation relative to it, this also means that a torque is still transmitted to a transmission input shaft 8 only by the electric machine when the clutch mechanism 2 is open. The transmission input shaft 8 is connected via abutment 10 and fastening device 12 to a rotor projection 14 formed at the rotor carrier 6 such that the transmission input shaft 8 is fixed with respect to rotation relative to the rotor projection 14.

Further, FIGS. 1 to 4 show a vibration absorber apparatus 4, which is arranged radially within the rotor 6 and is formed as a centrifugal pendulum absorber. The centrifugal pendulum absorber 4 shown in the drawings comprises a damper mass 40, which is enclosed by two damper mass carriers 42, 44. The damper mass carriers can preferably be arranged at the rotor carrier 6 and/or at the rotor projection 14 so as to be fixed with respect to rotation relative thereto.

Further, FIGS. 1 to 4 have a limiting device 50, which is configured to limit a movement of the at least one damper mass 40. According to the invention, the limiting device 50 is actuated by an element of the clutch arrangement 2.

Figure 2:
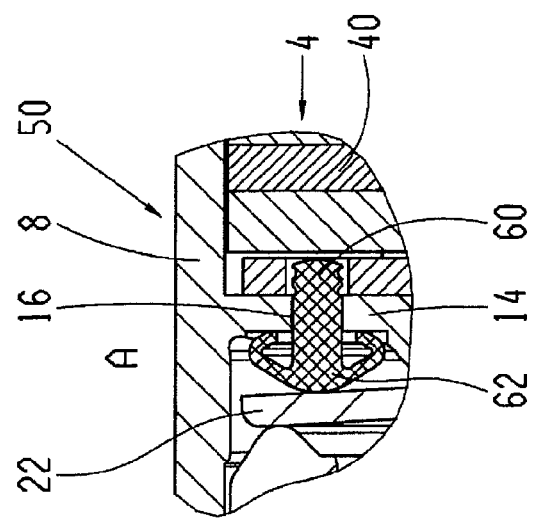
FIG. 2 shows a schematic rendering of a second preferred embodiment example of the constructional unit according to the invention.
Figure 2:
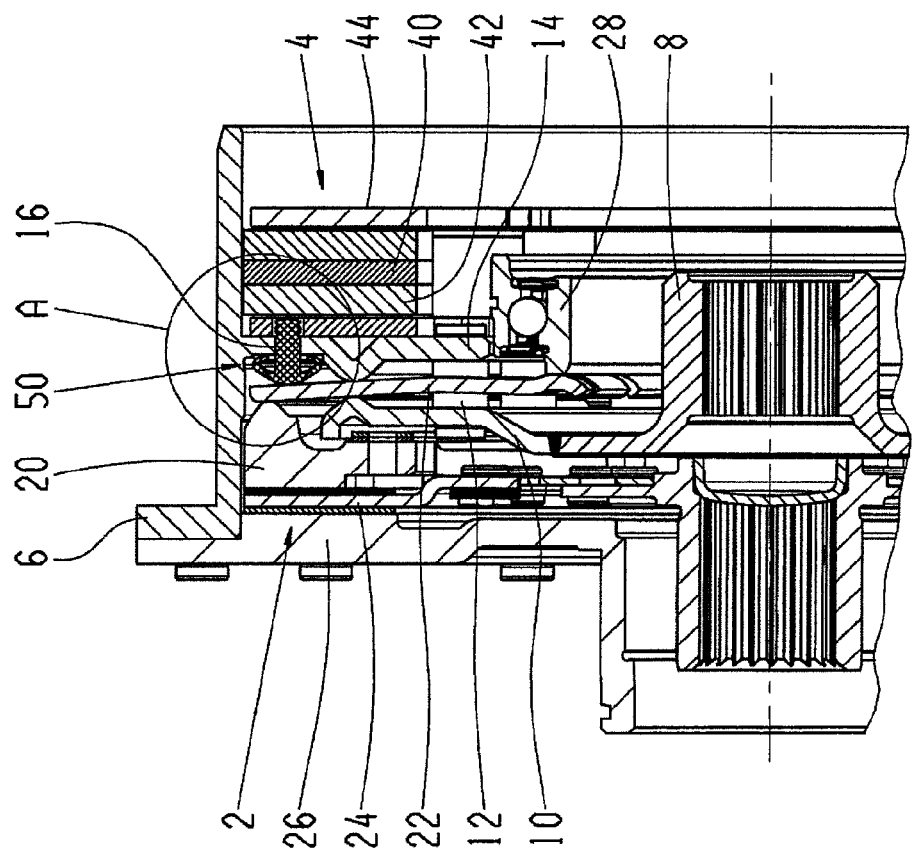
Figure 3:
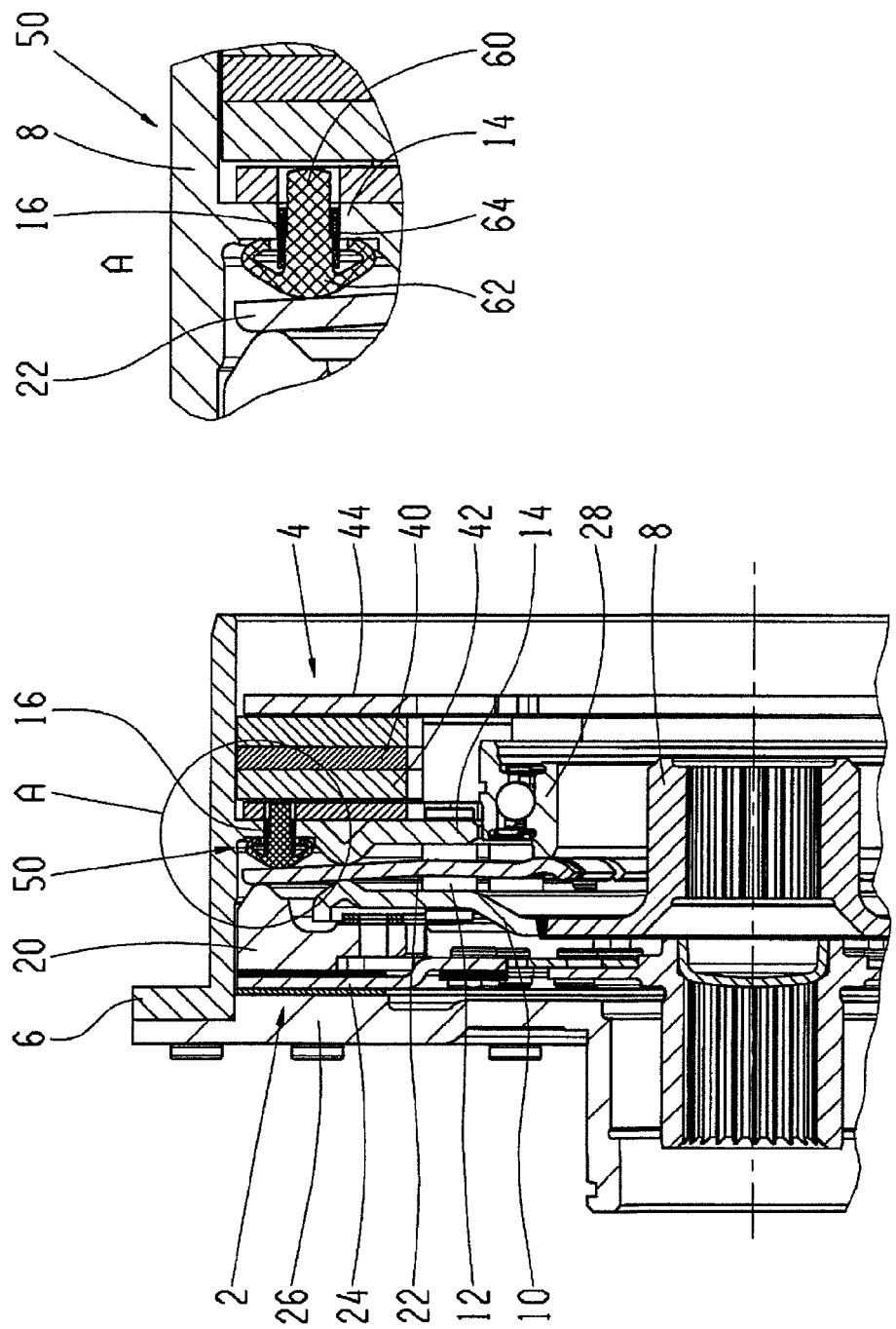
FIG. 3 shows a schematic rendering of a third preferred embodiment example of the constructional unit according to the invention.

In the embodiment examples shown in FIGS. 1 to 3, the clutch element actuating the limiting device 50 is the diaphragm spring 22, which contacts the limiting device 50 at the radially outer region of the diaphragm spring 22. When opening the clutch mechanism 2, the clutch release 28 moves axially in direction of the clutch disk 24 and likewise presses the diaphragm spring tongues 23 of the diaphragm spring 22 in direction of the clutch disk 24. The radially outer region of the diaphragm spring 22 accordingly moves in direction of the damper 4 and can act on the limiting device 50.

The respective limiting device 50 is shown in more detail in the enlarged views A in FIGS. 1 to 4.

In the embodiment example shown in FIG. 1 and in section A of FIG. 1, the limiting device 50 has a pressing pin 52 as an operative element. This pressing pin 52 extends through an aperture 16 in the rotor projection 14 in the direction of the vibration absorber 4. The pressing pin 52 is formed of a spring-loaded element 54, which exerts an axial force on the damper mass 40 and presses the latter against the damper mass carrier 44 for the purpose of clamping it. The spring-loaded element 54 is resiliently mounted within the pressing pin 52 by a spring 56. This spring 56 is therefore an axially elastic component that causes the force on the damper mass 40 to remain substantially constant even when the diaphragm spring deflection changes slightly due to wear.

As can also be seen from the enlarged view A in FIG. 1, the pressing pin 52 further has a spring element 58 configured to support the pressing pin 52 at the rotor projection 14 in a springing manner. This springing support causes the pressing pin 52 to move back into its idle position when the clutch mechanism is no longer actuated. In the idle position, the pressing pin 52 does not limit the movability of the damper masses.

FIG. 2 shows another preferred embodiment example in which the limiting device 50 has an operative element 60 formed of an elastomer. As in the embodiment example shown in FIG. 1, the operative element 60 also projects through apertures 14 in the rotor projection 14 and can be actuated axially by the diaphragm spring 22. Since the operative element 60 is already formed as an elastomer, there is already an axially elastic arrangement. Further, the operative element 60 shows elastically formed formations 62 in the region of the operative element 60 facing the diaphragm spring 22, which formations 62 are supported at the rotor projection 14 and ensure that the operative element 60 will return to its idle position, i.e., the position in which no force is applied to the damper mass 40. This can be seen especially clearly again in the enlarged view A in FIG. 2.

In addition to the resiliently formed portion 62, the operative element 60 formed as elastomer can also have an axial guide 64 as can be seen from FIG. 3. This axial guide 64 ensures that, when actuated, the operative element 60 cannot extend radially to the extent that it clamps in the aperture 16 at the rotor projection 14.

Figure 4:
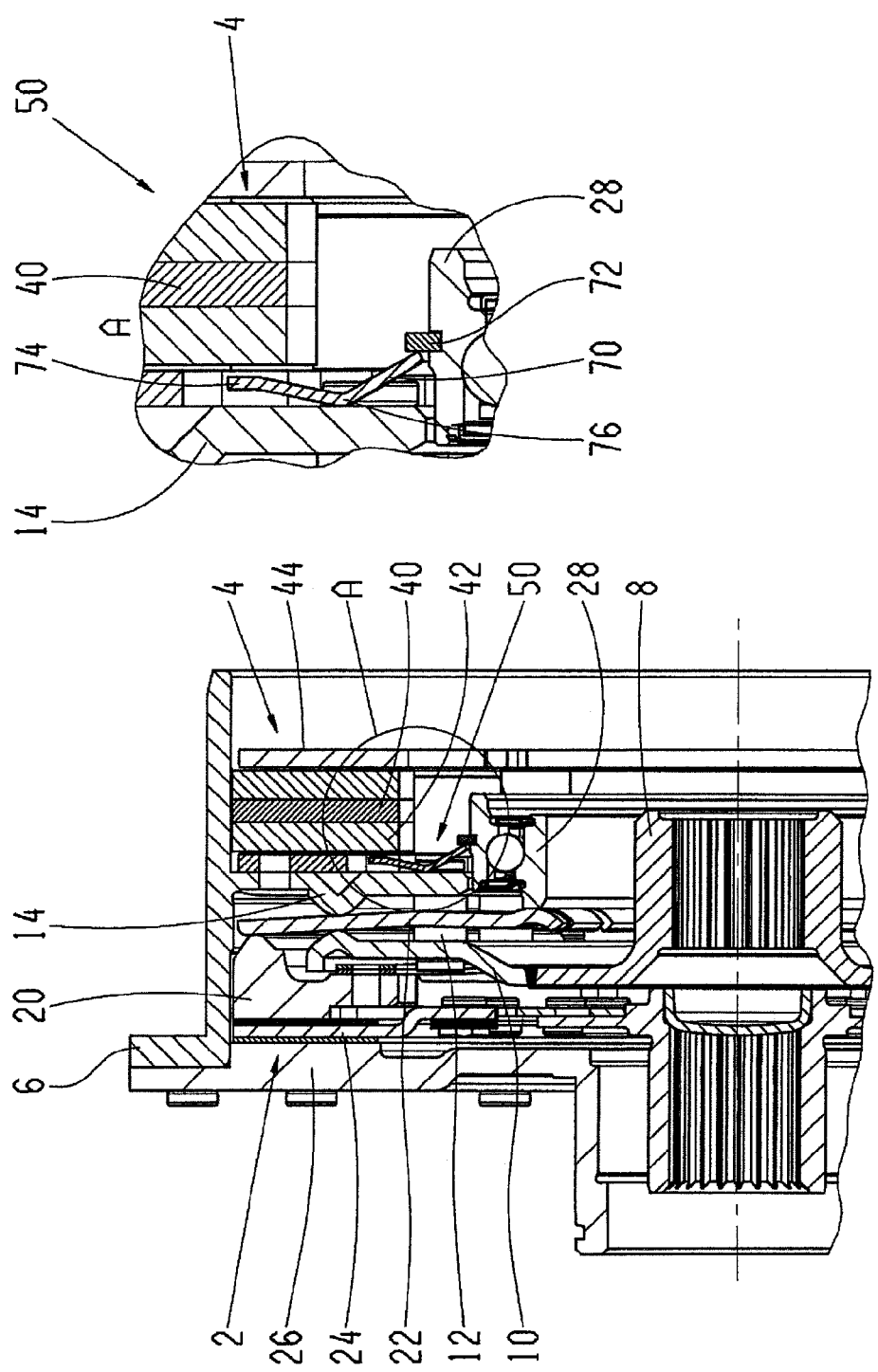
FIG. 4 shows a schematic rendering of a fourth preferred embodiment example of the constructional unit according to the invention.

As an alternative to the operative elements of the limiting device 50 which are actuated by the diaphragm spring 22, another element of the clutch device 2 can also be used to actuate the limiting device 50. For example, the embodiment example in FIG. 4 shows a limiting device 50 that can be actuated via the clutch release 28. To this end, as can be seen in the enlarged view A in FIG. 4, the limiting device 50 has a springing element, particularly a disk spring 70, which is supported at the supporting element 72, which is arranged at the clutch release 28 so as not to be displaceable axially. During axial movement of the clutch release 28, the supporting element 72 presses on the radially inner edge of the spring element 70, particularly the disk spring, such that the radially outer edge 74 of the disk spring 70 moves axially in direction of the vibration absorber 4 due to the configuration of the disk spring 70. To this end, the disk spring 70 is further supported at the rotor projection 14 in a region 76.

When the clutch is actuated by the clutch release 28, the radially outer edge 74 of the disk spring 70 also presses against the damper mass 40 and accordingly presses the latter against the damper mass carrier 44 so that the movement of the damper mass 40 is also limited in this case.

Alternatively, an axially elastic element could also be provided at the clutch release 28, which axially elastic element exerts a force directed axially in direction of the engine on the damper mass 40 and accordingly clamps the latter at the engine-side damper mass carrier 42 or directly at the rotor projection 14.

Apart from the embodiment examples shown above, a multitude of methods for clamping the damper mass are conceivable. For example, diaphragm springs, tangential leaf springs or disk springs can also be used between diaphragm spring 22 and vibration absorber 4. Also, the invention is not limited to the depicted arrangement of elements. In particular, the axial arrangement between clutch arrangement, vibration absorber apparatus and rotor may differ from the depicted embodiment example. Further, a rotor projection 14 serving as support for the diaphragm spring 22 can also be dispensed with and, for example, a radial portion of the rotor carrier can be used.

On the whole, by actively influencing the damper masses 40, a reliable clamping of the damper masses is brought about even in a hybrid drive with expected low speeds so that bothersome noises are prevented. In addition to the depicted embodiments, it is also possible, of course, that the clutch arrangement-vibration absorber combination can also be made independent from a rotor.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A constructional unit (1) for a drivetrain of a motor vehicle comprising:
   at least one clutch arrangement (2) configured to decouple an internal combustion engine from the drivetrain, the at least one clutch arrangement (2) having at least one clutch element;
   a speed-adaptive vibration absorber apparatus (4), configured to reduce vibrations in the drivetrain with at least one damper mass (40) deflectable along a deflection path; and
   a limiting device (50) configured to exert a force on the at least one damper mass (40) that limits the movement of the damper mass (40),
   wherein the limiting device (50) is further configured, for limiting the movement of the at least one damper mass (40), to be actuatable by the at least one clutch element.

2. The constructional unit (1) according to claim 1, wherein the limiting device (50) is further configured to apply a substantially axial force to the damper mass (40).

3. The constructional unit (1) according to claim 2, wherein the limiting device (50) has at least one operative element (52; 60) which is configured to act in a limiting manner on the damper mass (40), wherein the at least one operative element (52; 60) is axially elastic.

4. The constructional unit (1) according to claim 3, wherein the at least one operative element (52; 60) is further preloaded opposite to the direction of application of force.

5. The constructional unit (1) according to claim 3, wherein the at least one operative element (52) is a spring-loaded pressing element having a spring-loaded pressing pin.

6. The constructional unit (1) according to claim 3, wherein the at least one operative element (60) comprises an elastomer.

7. The constructional unit (1) according to claim 3, wherein the at least one operative element (52; 60) is a spring element comprising one selected from the group consisting of a tangential leaf spring, disk spring and as diaphragm spring.

8. The constructional unit (1) according to claim 3, wherein the limiting device (50) is directly connected to the clutch element.

9. The constructional unit (1) according to claim 2, wherein the clutch element actuating the limiting device (50) is a resilient return element of the clutch arrangement (2) comprising a diaphragm spring (22).

10. The constructional unit (1) according to claim 2, wherein the clutch element actuating the limiting device (50) is a clutch actuation unit comprising a clutch release (28).

11. The constructional unit (1) according to claim 1, wherein the vibration absorber apparatus (4) further has at least one damper mass carrier (42; 44) configured to support the at least one damper mass (40) such that the damper mass (40) is pendulously mounted.

12. The constructional unit (1) according to claim 11, further comprising an electric machine with a stator and a rotor, wherein the clutch arrangement (2) and/or the vibration absorber apparatus (4) and/or the limiting device (50) are arranged radially within the rotor.

13. The constructional unit (1) according to claim 12, wherein the operative element (52; 60) is spring-loaded opposite the rotor.

14. The constructional unit (1) according to claim 12, wherein the rotor further has a radially inwardly extending rotor projection (14) configured as a supporting element for at least one selected from the group consisting of a resilient return element of the clutch arrangement (2) and a preloading of the operative element (52; 60) of the limiting device (50).

15. The constructional unit (1) according to claim 12, wherein the damper mass carrier (42;44) is arranged at at least one selected from the group consisting of: (a) the rotor, and (b) the rotor projection (14) so as to be fixed with respect to relative rotation.

16. A hybrid drivetrain with an internal combustion engine and an electric machine provided parallel to the internal combustion engine, the electric machine being configured to transmit a torque from the internal combustion engine and/or electric machine to an output unit comprising a transmission, wherein the constructional unit (1) according to claim 1 is arranged between the internal combustion engine and the output unit.

17. The constructional unit (1) according to claim 1, wherein the speed-adaptive vibration absorber apparatus (4) is a centrifugal pendulum absorber.

* * * * *